(12) United States Patent
Hagström et al.

(10) Patent No.: US 9,657,953 B2
(45) Date of Patent: May 23, 2017

(54) VESSEL ATTACHMENT SYSTEM FOR A PORTABLE STOVE

(71) Applicant: Fenix Outdoor AB, Örnsköldsvik (SE)

(72) Inventors: Magnus Fredrik Hagström, Johanneshov (SE); Erland Brännholm, Stockholm (SE)

(73) Assignee: Fenix Outdoor AB, Örnsköldsvik (SE)

( * ) Notice: Subject to any disclaimer, the term of this patent is extended or adjusted under 35 U.S.C. 154(b) by 451 days.

(21) Appl. No.: 14/120,336

(22) Filed: May 14, 2014

(65) Prior Publication Data

US 2014/0338652 A1 Nov. 20, 2014

(30) Foreign Application Priority Data

May 14, 2013 (EP) .................................. 13 167 586

(51) Int. Cl.
*F24C 15/10* (2006.01)
*A47J 36/26* (2006.01)
*F24C 3/14* (2006.01)

(52) U.S. Cl.
CPC ............. *F24C 15/107* (2013.01); *A47J 36/26* (2013.01); *F24C 3/14* (2013.01)

(58) Field of Classification Search
CPC .... F16B 21/09; F24C 3/14; F24C 1/16; F24C 5/20; F24C 15/107; F24C 15/108; F16K 1/34; F21S 13/12; A47J 33/00; A47J 36/26; A47J 45/10
See application file for complete search history.

(56) References Cited

U.S. PATENT DOCUMENTS

| | | | | |
|---|---|---|---|---|
| 6,102,027 | A * | 8/2000 | Tilby | F24C 3/14 126/38 |
| 6,938,966 | B1 * | 9/2005 | Rouwhorst | A47B 87/008 312/111 |
| 2011/0214663 | A1 * | 9/2011 | Cox | A47J 36/2477 126/25 R |

* cited by examiner

*Primary Examiner* — Jason Lau
(74) *Attorney, Agent, or Firm* — Intellectual Property Law Group LLP (57) ABSTRACT

The present invention is directed to a vessel attachment system (1) for a portable stove comprising a vessel (2) and a vessel support (3), wherein the vessel (2) comprises a first attaching means and the vessel support (3) comprises a second attaching means. The first attaching means and the second attaching means are configured to provide for a positive locking between the vessel (2) and the vessel support (3). The invention is characterized in that the first attaching means is a polygonal opening (4) in a bottom area of the vessel (2) and the second attaching means is a polygonal supporting means (5), wherein the polygonal supporting means (5) is insertable into the polygonal opening (4). Subsequent relative rotational movement between the vessel (2) and the vessel support (3) after insertion of the polygonal supporting means (5) in to the polygonal opening (4) provides for the positive locking between the vessel (2) and the vessel support (3).

12 Claims, 7 Drawing Sheets

VESSEL ATTACHMENT SYSTEM FOR A PORTABLE STOVE

CROSS-REFERENCE TO RELATED APPLICATIONS

This application claims the benefit of European Patent Application No. 13 167 586.0, filed on May 14, 2013 in the European Patent Office, the entire disclosure of which is incorporated herein by reference.

BACKGROUND OF THE INVENTION

1. Field of the Invention

The present invention is directed to a vessel attachment system for a portable stove. The system comprises a vessel and a vessel support being securable to the portable stove, wherein the vessel comprises a first attaching means and the vessel support comprises a second attaching means and the first attaching means and the second attaching means are configured to provide for a positive locking between the vessel and the vessel support.

2. Background

A portable stove is generally used to heat the vessel for the preparation of the food contained within the vessel. Therefore, the vessel is placed on the vessel support above the burner. Albeit this basic principle being well approved for centuries, there are some disadvantages associated therewith. For instance, if the vessel is loosely placed on the vessel support, it might fall down due to misfortune or inadvertency. The person using the portable stove may thus get injured, i.e. burned by the hot food contained within the vessel. Furthermore, the food dropped on the ground is usually lost and cannot be consumed anymore. This might further lead to dangerous and severe situations, especially when being in a remote location far from any semblance of civilization.

To address this problem, there are some vessel attachment systems known in the state of the art that allow for a fixation of the vessel to the vessel support. The prior art systems are usually composed of a vessel having a first attaching means and the vessel support having a corresponding second attaching means to provide for a positive locking between the vessel and the vessel support. In general, one of the attaching means is composed of at least one radial pin and the other one of the attaching means is composed of a matching L-shaped slot, thus constituting some kind of bayonet-mount.

Although the prior art fastening systems work well, they are strongly subject to wear. This in turn increases the risk of malfunction over the time of use. The person relying on the safe fixation between the vessel and the vessel support will therefore be not very attentive when using the portable stove. However, an unintended separation between the vessel and the stove can lead to the dangerous situations described above. Furthermore, as the stove may also fall over, the risk of fire is distinctly increased.

SUMMARY OF THE INVENTION

Accordingly, it is the objective of the present invention to provide a vessel attachment system for a portable stove which is not that subject to wear and which thus greatly prevents the risk of an unintended separation of the vessel and the vessel support, i.e. the stove.

The problem is solved by an inventive vessel attachment system according to claim 1. Preferred embodiments of the present invention are disclosed and described in claims 2 to 10.

The inventive vessel attachment systems is characterized over the prior art vessel attachment systems in that the first attaching means is a polygonal opening in a bottom area of the vessel and the second attaching means is a polygonal supporting means, wherein the polygonal supporting means is insertable into the polygonal opening such that relative rotational movement between the vessel and the vessel support provides for the positive locking between the vessel and the vessel support.

Thus, for attachment of the vessel to vessel support, the polygonal supporting means is inserted into the polygonal opening in the vessel's bottom area. Subsequent rotational movement of the vessel relative to the vessel support (or the portable stove) will establish the positive lock between the vessel and vessel support. Therefore, the polygonal opening is designed as to allow for a convenient insertion of the polygonal supporting means, i.e. by providing a slight amount of play in between. In rotating the vessel relative to the vessel support, the corners of the polygonal supporting means will engage with the vessel's bottom area such that a secure attachment between the vessel and the supporting means is achieved. It has to be noted that a polygonal shape in sense of the present invention has to be understood as any shape virtually having some kind of corner.

The inventive structure has the advantage that the neither the polygonal opening not the polygonal supporting means are that subject to wear as the prior art devices. Accordingly, even if some wear occurs over time, this will not affect the functionality of the attachment system. Thus, an unintended separation between the vessel and the vessel support is greatly hampered.

According to another aspect of the present invention, the bottom area of the vessel comprises a base plate, the base plate being spaced from the bottom plate of the vessel, wherein the base plate comprising the polygonal opening. Thus, the inventive vessel has a twin bottom structure, wherein the lower structure, i.e. the base plate, is provided for the attachment to the vessel support and the upper structure, i.e. the bottom plate, is provided for cooking in the conventional manner. This allows for a facilitated and convenient handling of the vessel attachment system. Concerning the bottom plate, said plate is conventionally used e.g. for food preparation or for boiling water or the like.

Preferably, the vessel comprises a circumferential connecting portion for connecting the base plate and the bottom plate, the circumferential connecting portion comprising a plurality of ventilation holes. The circumferential connection portion spaces the base plate from the bottom plate and further allows for ideal heat dissipation between the vessel and the portable stove or the burner receptively.

According to a further aspect of the present invention, the base plate comprises at least one mechanical stop for the polygonal supporting means, such that the relative rotational movement between the vessel and the vessel support is limited. Thus, the mechanical stop is configured to contact the supporting means after the vessel has been rotated to a certain amount. Further rotation of the vessel is thus prohibited. In addition, it is preferable that the at least one mechanical stop is arranged as to allow a rotation for establishing the attachment only in one direction, e.g. clockwise. Further, it is preferable that direction of rotation for attachment is the same as the rotation for screwing the burner in the combustible container. Thus, mishandling and unintended separation between the vessel and the supporting means on the one hand and the supporting means and the combustible container on the other hand is prevented.

Preferably, the at least one mechanical stop is a dent protruding from the base plate towards the bottom plate. Dents can easily be machined during production of the vessel. In addition, a structure may be disposed adjacent to the dent which gives a haptic and/or acoustic feedback to the user that the polygonal supporting means is in contact with the dent or will contact the dent if the vessel is only rotated slightly more.

According to another aspect of the invention, the polygonal supporting means comprises a polygonal steel ring, the polygonal steel ring being fixed to the vessel support. A steel ring can simply be bent into the required polygonal shape. Furthermore, the steel ring itself offers some kind of flexibility which facilitates the introduction thereof through the polygonal opening in the vessel's bottom area. As a matter of course, the steel ring itself is relatively fixed to the vessel support, such that it is not displaced when the vessel is relatively rotated.

Preferably, the vessel support comprises a vessel support plate and a steel ring attachment means extending from the vessel support plate towards the vessel. The steel ring is fixed to the steel ring attachment means such that the steel ring is substantially spaced from the vessel support plate. Hence, there is a gap between steel ring and the vessel support plate. When the vessel is attached to the vessel support, the respective part of the vessel's bottom area is sandwiched between the steel ring and the vessel support plate. Thus, an unintended separation of the vessel from the vessel support is prohibited.

According to another aspect of the present invention the steel ring attachment means has a cylindrical shape and comprises a plurality of slots on its outer peripheral surface, wherein the polygonal steel ring is disposed within the slots. This structure can easily be machined and allows to securely fix the steel ring such that it cannot rotate relative to the vessel support. In addition, the cylindrical shape of the steel ring attachment means allows for ideal dissipation as the burner is to be located in the center of the steel ring attachment means.

Preferably, the corners of the polygonal steel ring are bent towards the vessel support plate. This pre-bent structure creates some kind of flex within the steel ring. When the steel ring is inserted through the polygonal opening and the vessel is rotated subsequently, the bent corners are slightly pushed in a direction away from the vessel support plate by the respective part of the vessel's bottom area. The resulting elastic force helps to keep the vessel in place. In addition, the bent corners act like a ramp for the vessel and facilitate the attachment in that the polygonal steel ring can more conveniently be inserted into the polygonal opening.

In a preferred embodiment, the polygonal opening is a triangular opening and the polygonal supporting means is a triangular supporting means. The triangular shape allows for a convenient handling of the vessel attachment system.

BRIEF DESCRIPTION OF THE DRAWINGS

Specific embodiments of the invention will now be described below, by way of example, with reference to accompanying drawings, of which.

DETAILED DESCRIPTION OF SPECIFIC EMBODIMENTS

Figure 1A:
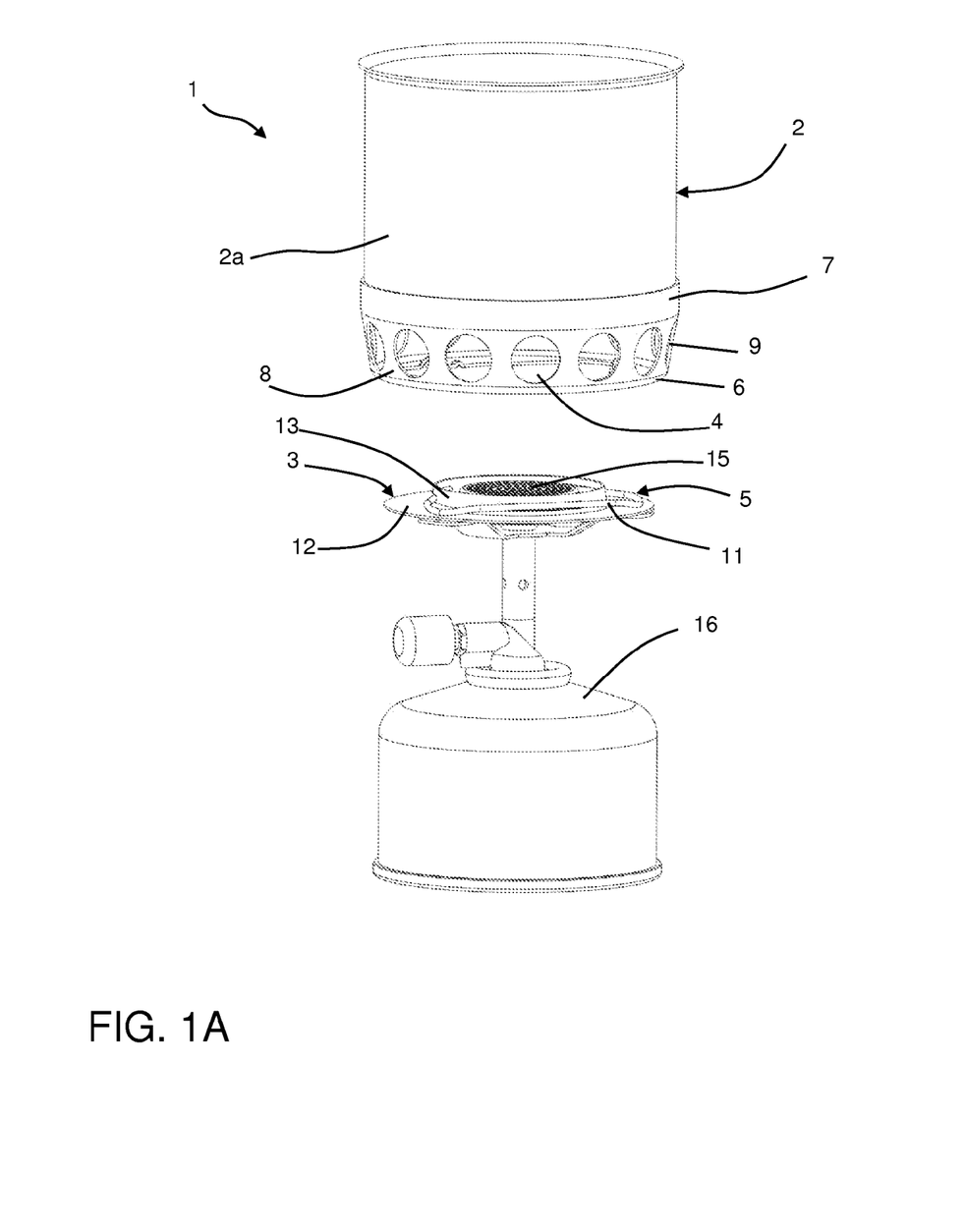
FIGS. 1A to 1B are perspective views of a portable stove with an inventive vessel attachment system.
Figure 1B:
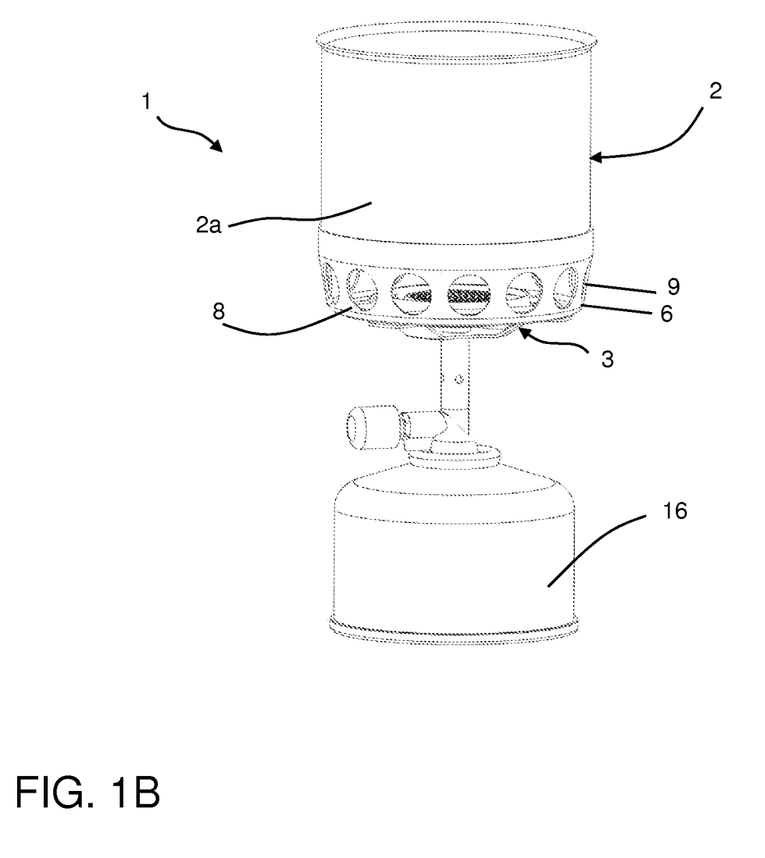
Figure 2:
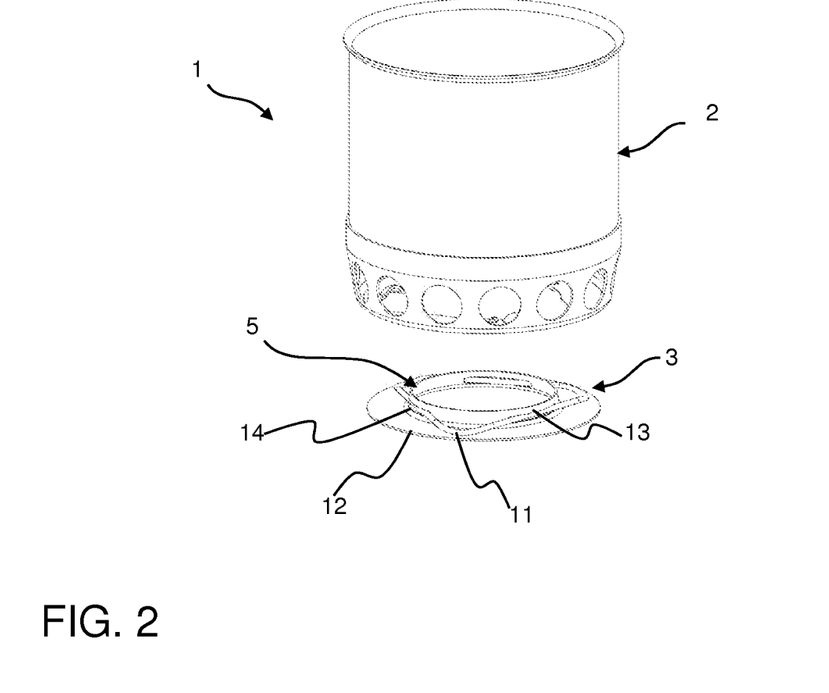
FIG. 2 is a detailed perspective view of the inventive vessel attachment system.

FIG. 1 to FIG. 6 all relate to a first embodiment of an inventive vessel attachment system 1. As shown in FIG. 1A, FIG. 1B and FIG. 2, an inventive vessel attachment system 1 is provided for a portable stove and comprises of a vessel 2 and a vessel support. The vessel 2 comprises a vessel main body 2a, a base plate 6, a (interior) bottom plate 7, a circumferential connecting portion 8 connecting the base plate 6 and the bottom plate 6. A plurality of ventilation holes 9 are provided along the peripheral surface of the connecting portion 8 for an ideal heat dissipation, wherein the connecting portion 8 spaces the base plate 6 from the bottom plate 7. The vessel 2 further comprises a first attachment means in form of a polygonal opening 4 provided in the base plate 6. The polygonal opening 4 according to the first embodiment is substantially equilaterally triangular in its shape and the balance point is centered relative to the annular base plate 6, and hence, to the vessel 2. The corners 4a, 4b and 4c of the polygonal opening 4 are rounded.

Figure 3:
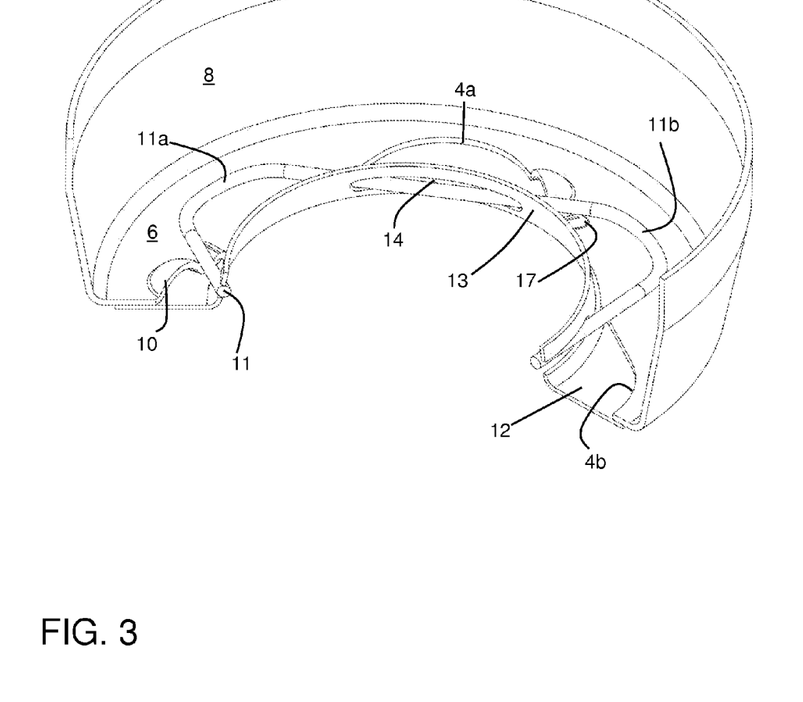
FIG. 3 is a perspective cutaway view of the vessel attached to the vessel support.
Figure 4:
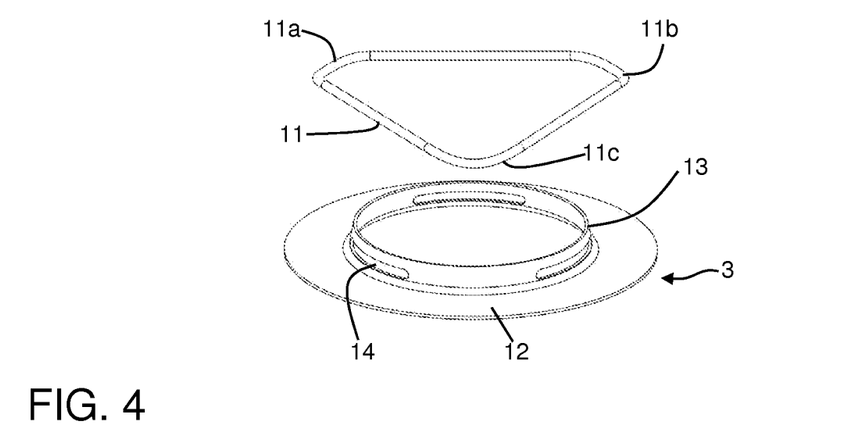
FIG. 4 is an exploded perspective view of the vessel support.
Figure 5:
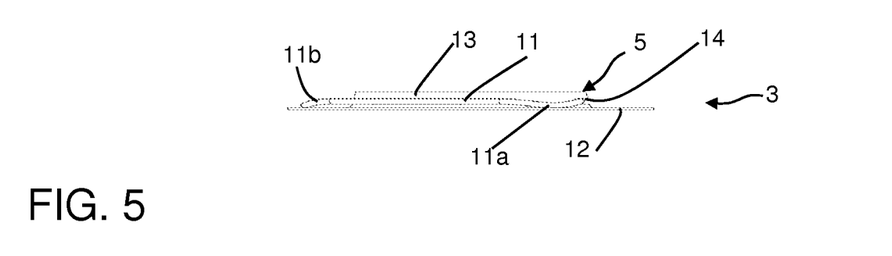
FIG. 5 is a side view of the vessel support.
Figure 6A:
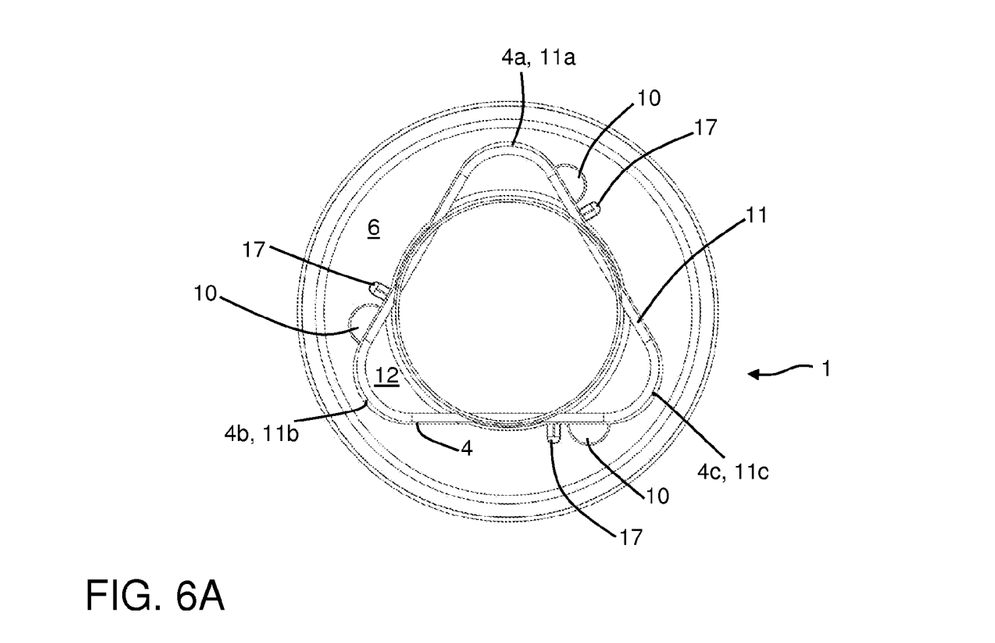
FIGS. 6A to 6B are cutaway top views of the vessel attached to the vessel support.
Figure 6B:
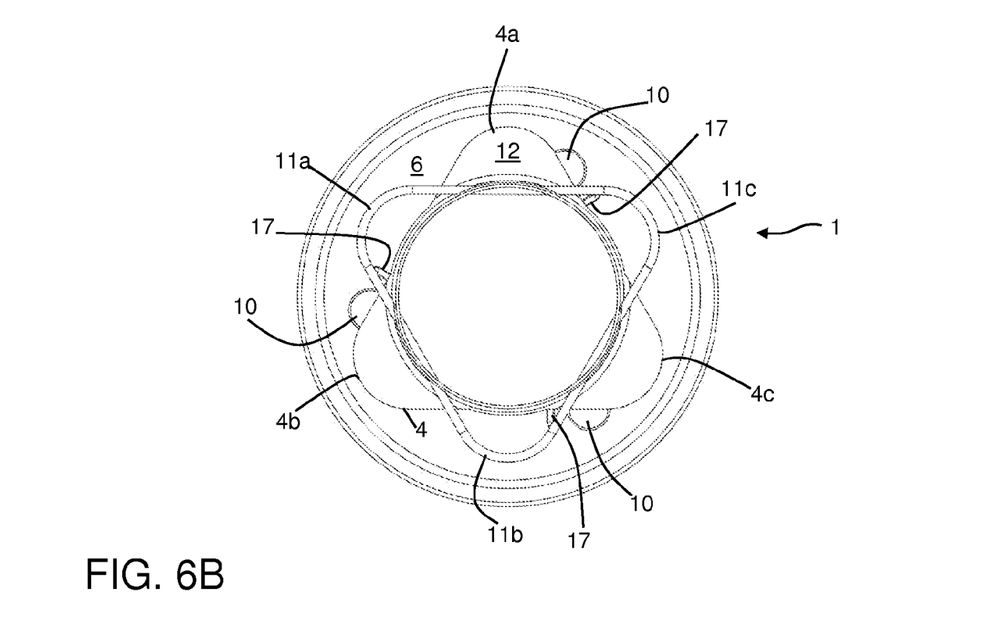
Figure 7A:
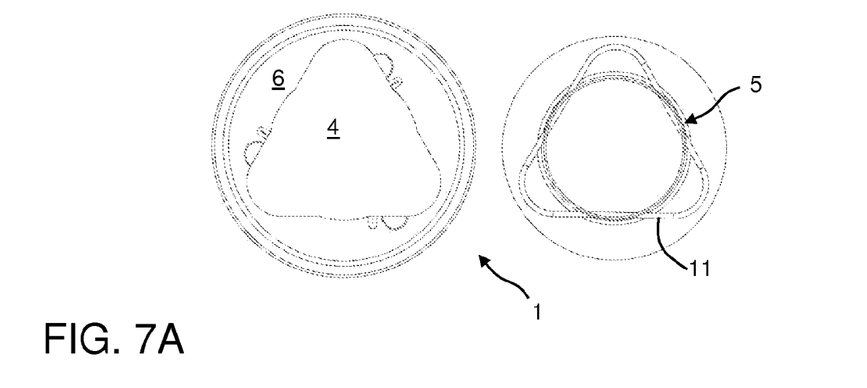
FIGS. 7A to 7C are overviews over differently polygonal shaped attachment systems.

As shown in FIG. 3, FIG. 6 and FIG. 7A, three dents 10 protrude from the base plate 6 towards the bottom plate 7. The dents 10 are provided on every side of the triangular shaped polygonal opening 4 and directly adjacent to one of the rounded corners 4a-4c. Adjacent to the dents 10 there are three smaller structures 17 which also protrude from the base plate 6 towards the bottom plate 7.

The vessel support 3 is provided with a polygonal supporting means 5 as second attaching means comprising of a polygonal steel ring 11, a vessel support plate 12, and a steel ring attachment means 13 extending from the vessel support plate 12, as can directly be derived form FIG. 1A, and FIG. 2 to FIG. 5. The polygonal steel ring 11 is of an equilateral triangular shape and is non-movably fixed to the steel ring attachment means 13. The triangular shape of the steel ring 11 corresponds to the triangular shape of the polygonal opening 4 such that the steel ring 11 is designed to be insertable into the polygonal opening 4. Therefore, a slight play is provided between the steel ring 11 and the polygonal opening 4. In addition, the corners 11a-11c of the steel ring are also rounded, but are slightly bent in one direction, such that the corners 11a-11c are bent towards the vessel support plate 12 when the steel ring 11 is fixed to the vessel support 3. This bent corners 11a-11c further help to insert the steel ring 11 into the polygonal opening 4, as there will be a guiding function of the bent corners 11a-11c.

For the non-movable fixation of the steel ring 11 to the vessel support 3, the steel ring attachment means 13 is of a cylindrical shape and is centered on the vessel support 3. Three slots 14 are disposed on the outer peripheral surface of the steel ring attachment means 13 such that one of each sides of the steel ring 11 can be disposed within one of each slots 14. This allows for rigid fixation of the steel ring 11 on the vessel support 3. As can be seen from e.g. FIG. 5, the steel ring 11 is spaced from the vessel support plate 12 when being installed, but the corners 11a-11c of the steel ring 11 are bent such that they are in contact or almost in contact with the vessel support plate 12.

In the following, the functionality of the vessel attachment system 1 and thus, the attachment of the vessel 2 to the vessel support 3 will be described. As shown in FIG. 1A and FIG. 6A, to attach the vessel 2 to the vessel support 3, the vessel 2 is moved towards the vessel support 3 such that the steel ring 11 is introduced into the polygonal opening 4. Subsequently, the vessel 2 (or the vessel support 3, which is mounted to the burner 15, the latter one mounted to the combustible container 16) is relatively rotated to the vessel support 3 (or the other way round). It has to be noted that a rotational movement is only possible in a counterclockwise direction, as the dents 10 will contact the steel ring 11 after only a slight rotation in the clockwise direction, such that a further rotation is no longer possible. This is mandatory, as otherwise the user could unintentionally detach the burner 15 from the combustible container 16, if a rotation in the clockwise direction would not be inhibited.

When turning the vessel 2, the bent corners 11a-11c of the steel ring 11 will be pushed into the direction of the bottom plate 7 by the base plate 6. Thus, a force is exerted by the steel ring 11 onto the base plate 6 which helps to fix the base plate 6 in its position. The vessel 2 is turned until the steel ring contacts the structures 17, which can be transcended by the steel ring 11. However, the transition of the structures 17 will give a haptic and acoustic feedback to the user that the positive lock between the vessel 2 and the vessel support 3 is established, as the steel ring 11 contacts the dents 10 and the relative rotational movement is limited (after a rotation of slightly less then 120°), as shown in FIG. 6A, 6B and in the cutout of FIG. 3. Thus, no further rotation is possible anymore and a positive locking between the vessel 2 and the vessel support 3 is established. To detach the vessel 2 from the vessel support 3, the vessel 2 is rotated in the clockwise direction until the steel ring 11 can be removed again from the polygonal opening 4 and the positive lock is abolished.

Figure 7B:
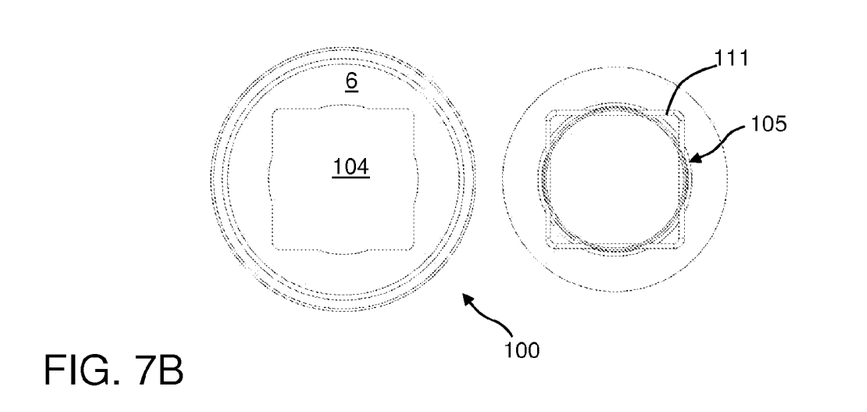

As a matter of course, the shape of the polygonal opening 4 and the steel ring 11 is not limited to be of a triangular shape. A second embodiment of an inventive vessel attachment system 100 is shown in FIG. 7B. The polygonal opening 104 and the steel ring 111 of the polygonal supporting means 105 are of a rectangular shape, but the functionality is identical to the one described above.

Figure 7C:
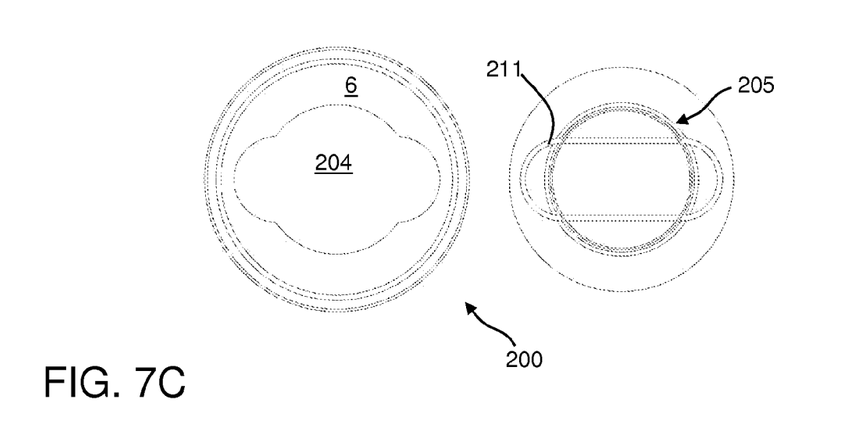

A third embodiment of an inventive vessel attachment system 200 is shown in FIG. 7C. The polygonal opening 204 and the steel ring 211 of the polygonal supporting means 205 are of a quadratic shape, wherein the shorter sides of the cuboid shaped opening 204 and steel ring 211 are rounded (and bent respectively). The functionality is similar to the one described above.

REFERENCE SIGNS 1, 100, 200 vessel attachment system
2 vessel
2a vessel main body
3 vessel support
4, 104, 204 polygonal opening/first attachment means
4a-4c corners of the polygonal opening
5, 105, 205 polygonal supporting means/second attachment means
6 base plate
7 bottom plate
8 connecting portion
9 ventilation hole
10 dent
11, 111, 211 steel ring
11a-11c corners of the steel ring
12 vessel support plate
13 steel ring attachment means
14 slot
15 burner
16 combustible container
17 structure

What is claimed is:

1. A vessel attachment system (1, 100, 200) for a portable stove comprising a vessel (2) and a vessel support (3), wherein the vessel (2) comprises a first attaching means and the vessel support (3) comprises a second attaching means;
and the first attaching means and the second attaching means are configured to provide for a positive locking between the vessel (2) and the vessel support (3), characterized in that
the first attaching means is a polygonal opening (4, 104, 204) in a bottom area of the vessel (2) and the second attaching means is a polygonal supporting means (5, 105, 205), wherein the polygonal supporting means (5, 105, 205) is insertable into the polygonal opening (4, 104, 204) such that relative rotational movement between the vessel (2) and the vessel support (3) provides for the positive locking between the vessel (2) and the vessel support (3);
the polygonal supporting means (5, 105, 205) comprises a polygonal steel ring (11, 111, 211), the polygonal steel ring being (11, 111, 211) fixed to the vessel support (3); and
the vessel support (3) comprises a vessel support plate (12) and a steel ring attachment means (13) extending from the vessel support plate (12) towards the vessel (2), wherein the steel ring (11, 111, 211) is fixed to the steel ring attachment means (13) such that the steel ring (11, 111, 211) is substantially spaced from the vessel support plate (12).

2. The vessel attachment system (1, 100, 200) according to claim 1, characterized in that
the bottom area of the vessel comprises a base plate (6), the base plate (6) being spaced from the bottom plate (7) of the vessel (2), wherein the base plate (6) comprising the polygonal opening (4, 104, 204).

3. The vessel attachment system (1, 100, 200) according to claim 2, characterized in that
the vessel (2) comprises a circumferential connecting portion (8) for connecting the base plate (6) and the bottom plate (7), the circumferential connecting portion (8) comprising a plurality of ventilation holes (9).

4. The vessel attachment system (1, 100, 200) according to claim 2, characterized in that
the base plate (6) comprises at least one mechanical stop (10) for the polygonal supporting means (5, 105, 205), such that the relative rotational movement between the vessel (2) and the vessel support (3) is limited.

5. The vessel attachment system (1, 100, 200) according to claim 4, characterized in that
the at least one mechanical stop is a dent (10) protruding from the base plate (6) towards the bottom plate (7).

6. The vessel attachment system (1, 100, 200) according to claim 1, characterized in that
the steel ring attachment means (13) has a cylindrical shape and comprises a plurality of slots (14) on its outer peripheral surface, wherein the polygonal steel ring (11, 111, 211) is disposed within the slots (14).

7. The vessel attachment system (1, 100, 200) according to claim 1, characterized in that
the corners (11*a*, 11*b*, 11*c*) of the polygonal steel ring (11) are bent towards the vessel support plate (12).

8. The vessel attachment system (1) according to claim 1, characterized in that
the polygonal opening (4) is a triangular opening and the polygonal supporting means (5) is a triangular supporting means.

9. The vessel attachment system according to claim 3, characterized in that
the base plate (6) comprises at least one mechanical stop (10) for the polygonal supporting means (5, 105, 205), such that the relative rotational movement between the vessel (2) and the vessel support (3) is limited.

10. The vessel attachment system according to claim 9, characterized in that
the at least one mechanical stop is a dent (10) protruding from the base plate (6) towards the bottom plate (7).

11. The vessel attachment system according to claim 2, characterized in that
the polygonal opening (4) is a triangular opening and the polygonal supporting means (5) is a triangular supporting means.

12. The vessel attachment system according to claim 3, characterized in that
the polygonal opening (4) is a triangular opening and the polygonal supporting means (5) is a triangular supporting means.

* * * * *